(12) United States Patent
Lee et al.

(10) Patent No.: US 8,236,089 B2
(45) Date of Patent: Aug. 7, 2012

(54) PREPARATION METHOD OF COPPER PARTICLE COMPOSITION

(75) Inventors: Woo-Ram Lee, Daejeon (KR); Sang-Ho Kim, Daejeon (KR); Sung-Ho Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 329 days.

(21) Appl. No.: 12/452,751

(22) PCT Filed: Jul. 24, 2008

(86) PCT No.: PCT/KR2008/004342
§ 371 (c)(1),
(2), (4) Date: Jan. 21, 2010

(87) PCT Pub. No.: WO2009/014392
PCT Pub. Date: Jan. 29, 2009

(65) Prior Publication Data
US 2010/0116089 A1    May 13, 2010

(30) Foreign Application Priority Data

Jul. 26, 2007   (KR) .................. 10-2007-0075341
Mar. 10, 2008   (KR) .................. 10-2008-0022121

(51) Int. Cl.
*B22F 9/24* (2006.01)
(52) U.S. Cl. .......................................... 75/362; 75/373
(58) Field of Classification Search .................. None
See application file for complete search history.

(56) References Cited

U.S. PATENT DOCUMENTS

| 6,679,938 B1 * | 1/2004 | Kim et al. .................. 75/365 |
| 2006/0098065 A1 | 5/2006 | Maruyama et al. |
| 2008/0011125 A1 | 1/2008 | Shirata et al. |

FOREIGN PATENT DOCUMENTS

| JP | 05-221637 | 8/1993 |
| JP | 2004-176147 | 6/2004 |
| JP | 2006-096655 | 4/2006 |
| KR | 10-2005-0084099 | 8/2005 |

OTHER PUBLICATIONS

Park, J.P. et al., "Preparation of fine Ni powders from nickel hydrazine complex", Materials Chemistry and Physics, vol. 97, pp. 371-378, 2006.*

Anzlovar et al: "Copper(I) oxide and metallic copper particles formed in 1, 2-propane diol", Journal of the European Ceramic Society, Elsevier Science Publishers, Barking, Essex, GB, vol. 27, No. 2-3, Nov. 19, 2006, pp. 987-991, XP005729697, ISSN: 0955-2219, DOI: 10.1016/J.JEURCERAMSOC. 2006.04.131.

* cited by examiner

*Primary Examiner* — George Wyszomierski
(74) *Attorney, Agent, or Firm* — McKenna Long & Aldridge LLP

(57) ABSTRACT

A preparation method of a copper particle composition includes dissolving a copper carboxyl compound, or a carboxyl group-containing compound and a copper salt, in a solvent to prepare a copper(II) precursor solution; putting a weak reducing agent with a standard reduction potential of −0.2 to −0.05V to the prepared copper(II) precursor solution to assemble a plurality of $Cu_2O$ fine particles having an average diameter of 1 to 100 nm with a standard deviation of 0 to 10%, thereby forming spherical $Cu_2O$ assembly particles having an average diameter of 0.1 to 10 μm with a standard deviation of 0 to 40%; reducing the spherical $Cu_2O$ assembly particles into copper particles by using a reducing agent; and separating the copper particles from the result product. Thus, copper particles can be produced fast, economically, and the obtained copper particles have good crystallinity and good resistance against oxidation.

13 Claims, 7 Drawing Sheets

PREPARATION METHOD OF COPPER PARTICLE COMPOSITION

This application claims the benefit of PCT/KR2008/004342 filed on Jul. 24, 2008, Korean Patent Application No. 10-2007-0075341 filed on Jul. 26, 2007 and Korean Patent Application No. 10-2008-0022121 filed on Mar. 10, 2008, all of which are hereby incorporated herein by reference for all purposes in their entirety.

TECHNICAL FIELD

The present invention relates to a preparation method of a copper particle composition used for electronic materials such as copper wiring material and copper bonding material, and more particularly to a method for simply preparing a copper particle composition from a copper(II) precursor solution.

BACKGROUND ART

Copper particles are widely used for electronic materials such as copper wiring material and copper bonding material due to good electric conductivity and low price. More particularly, copper particles may be used for wiring and pier burying materials of a mount circuit board, part bonding materials of a mount circuit board, electrode materials of flat panel display, electronic sealed materials of resin products or the like.

Such copper particles may advantageously form a fine wiring using various methods such as screening printing, dispensing, ink-jetting and spraying due to their small diameter.

To make copper particles, there have been proposed various methods such as mechanical grinding, co-precipitation, spraying, sol-gel, and electrolysis. However, most copper particle making methods are too complicated or exhibit bad economical efficiency.

Korean Laid-open Patent Publication No. 10-2005-84099 discloses a method for reducing copper(II) precursor using a hydrazine-based reducing agent to make $Cu_2O$ particles and then reducing the $Cu_2O$ particles to make a copper particle composition. However, when $Cu_2O$ particles are made using such a strong reducing agent, the size of generated $Cu_2O$ particles is greatly increased due to rapid reduction reaction, so it is difficult to control shape and particle size of $Cu_2O$ assembly particles.

Meanwhile, copper particles exhibit a strong tendency to be oxidized into CuO in the atmosphere, and thus electric conductivity is deteriorated. In addition, in case copper particles have bad crystallinity, electric conductivity is also deteriorated since the bad crystallinity disturbs flow of electrons.

DISCLOSURE

Technical Problem

Therefore, it is an object of the present invention to provide an economic preparation method of a copper particle composition, which allows to make copper particles relatively fast even at a normal temperature under the atmospheric environment.

Another object of the present invention is to provide a preparation method of a copper particle composition, which exhibits good crystallinity and good resistance against oxidation.

Technical Solution

In order to accomplish the above object, the present invention provides a preparation method of a copper particle composition, comprising:

[Step 1] dissolving a copper carboxyl compound expressed by the following chemical figure 1, or a carboxyl group-containing compound expressed by the following chemical figure 2 and a copper salt, in a solvent to prepare a copper(II) precursor solution;

Chemical Figure 1 where $R_1$ is an alkyl group of $C_1$ to $C_{18}$,

Chemical Figure 2 where $R_1$ is an alkyl group of $C_1$ to $C_{18}$,

[Step 2] putting a weak reducing agent with a standard reduction potential of −0.2 to −0.05V to the prepared copper (II) precursor solution to assemble a plurality of $Cu_2O$ fine particles having an average diameter of 1 to 100 nm with a standard deviation of 0 to 10%, thereby forming spherical $Cu_2O$ assembly particles having an average diameter of 0.1 to 10 μm with a standard deviation of 0 to 40%;

[Step 3] reducing the spherical $Cu_2O$ assembly particles into copper particles by using a reducing agent; and

[Step 4] separating the copper particles from the result product.

In the preparation method of a copper particle composition according to the present invention, the weak reducing agent may use ascorbic acid, diol compound, citric acid, fructose, amine compound, α-hydroxy ketone compound, succinic acid, maltose, and so on.

In the preparation method of a copper particle composition according to the present invention, a surfactant ma be added in any or both of the Step 1 and the Step 2, and the surfactant may be a single molecule surfactant having at least one functional group selected from the group consisting of —OH, —COOH, —SH and —NH, a polymer surfactant selected from the group consisting of polyacrylamide, polyvinylpyrrolidone, and polyvinylalcohol, and their mixtures. Among them, polyacrylamide is most preferred as the surfactant.

In the preparation method of a copper particle composition according to the present invention, the Step 2 and the Step 3 may be executed at 5 to 40° C.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

A spherical $Cu_2O$ assembly particle composition according to the present invention may be prepared in the following way.

Figure 1:
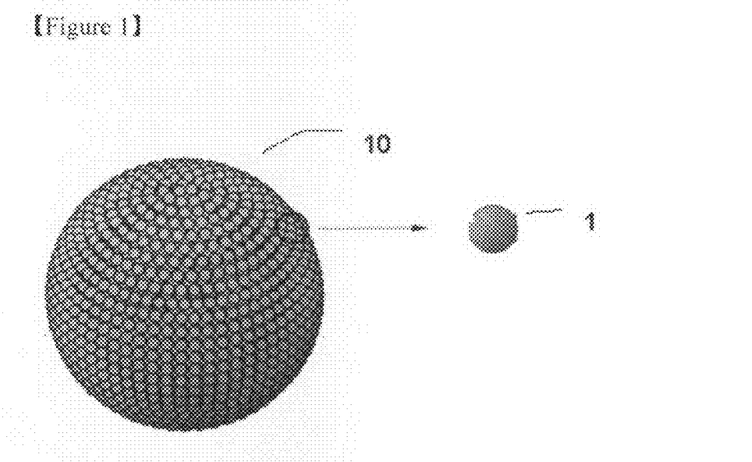
FIG. 1 is a schematic view showing a $Cu_2O$ assembly particle according to the present invention.
Figure 2:
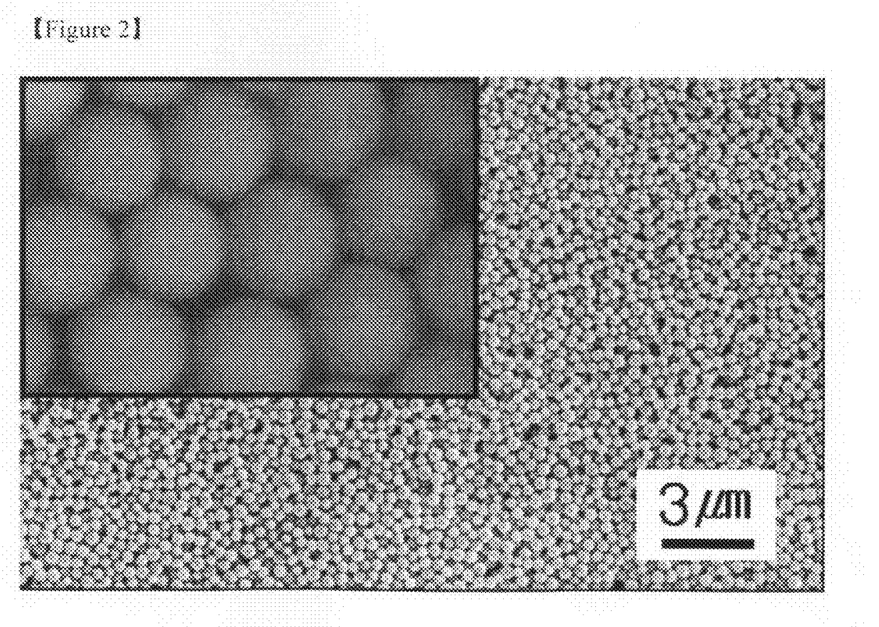
FIG. 2 is a SEM photograph showing a $Cu_2O$ particle prepared according to a preparation example 1.

First, a copper carboxyl compound expressed by the following chemical figure 1, or a carboxyl group-containing compound expressed by the following chemical figure 2 and a copper salt, are dissolved in a solvent to prepare a copper(II) precursor solution (Step 1).

$(R_1—COO)_2Cu$      [Chemical Figure 1]

where $R_1$ is an alkyl group of $C_1$ to $C_{18}$.

$R_1—COOH$      [Chemical Figure 2]

where $R_1$ is an alkyl group of $C_1$ to $C_{18}$.

The copper carboxyl compound of the chemical figure 1 may be representatively $(CH_3COO)_2Cu$, and the carboxyl group-containing compound of the chemical figure 2 may be representative $CH_3COOH$. In addition, the copper salt may be representatively copper nitrate, copper halide, copper hydroxide, and copper sulfate, which may be used in single or in mixture.

In addition, the solvent may use any kind of solvent that can allow formation of a $Cu_2O$ assembly particle when a weak reducing agent is added thereto, as a solvent capable of dissolving the copper carboxyl compound or the carboxyl group-containing compound and the copper salt. For example, the solvent may use water, $C_1$-$C_6$ low alcohol, dimethyl formamide, dimethyl sulfoxide, tetrahydrofuran, acetonitrile, and so on, which may be used in single or in mixture. Preferably, the solvent uses a solvent containing water.

Subsequently, a weak reducing agent with a standard reduction potential of −0.2 to −0.05V is added to the prepared $Cu_2O$ precursor solution to assemble a plurality of $Cu_2O$ fine particles having an average diameter of 1 to 100 nm with a standard deviation of 0 to 10%, thereby forming spherical $Cu_2O$ assembly particles having an average diameter of 0.1 to 10 μm with a standard deviation of 0 to 40% (Step 2).

The weak reducing agent can be put before copper(II) precursors are dissolved in the solvent in the Step 1, or the weak reducing agent can also be dissolved in a separate solvent and then put into the copper(II) precursor solution. The weak reducing agent preferably has a standard reduction potential of −0.2 to −0.05V. If the standard reduction potential is less than −0.2V, the reduction speed is increased so greatly that the obtained $Cu_2O$ fine particles have irregular sizes, which makes it impossible to form an assembly particle. If the standard reduction potential exceeds −0.05V, $Cu_2O$ fine particles are formed not easily or too slowly, thereby deteriorating economic efficiency. This weak reducing agent may use ascorbic acid, diol compound, citric acid, fructose, amine compound, α-hydroxy ketone compound, succinic acid, maltose and so on, which can be used in single or in mixture. Size of assembly particles and $Cu_2O$ fine particles can be controlled by changing reaction conditions such as kind of solvent, and addition of surfactant.

FIG. 1 is a schematic view showing the $Cu_2O$ assembly particle obtained in the Step 2. Referring to FIG. 1, the $Cu_2O$ assembly particle 10 is formed by assembling a plurality of $Cu_2O$ fine particles 1.

The $Cu_2O$ fine particles 1 preferably have an average diameter of 1 to 100 nm. If the average diameter of the $Cu_2O$ fine particles 1 is less than 1 nm, it is not easy to form the particles. If the average diameter exceeds 100 nm, it is difficult to exhibit properties of the fine particles themselves. The average diameter of the fine particles 1 is more preferably 1 to 10 nm. In addition, a standard deviation for the diameters of the $Cu_2O$ fine particles 1 is preferably 0 to 10%. If the standard deviation exceeds 10%, it is not easy to form a $Cu_2O$ assembly particle with uniform size and shape.

Meanwhile, the $Cu_2O$ assembly particle 10 has a spherical shape with an average diameter of 0.1 to 10 μm, preferably 0.3 to 2 μm. In addition, a standard deviation for the diameters of the $Cu_2O$ assembly particles 10 is preferably 0 to 40%, more preferably 0 to 20%. Within the above range, a composition containing copper particles with suitable size and also ensuring easy reduction to copper particles can be made.

In this specification, the spherical shape is defined as including not only a perfect sphere whose aspect ratio is 1 at each section, but also an oval sphere whose aspect ratio is less than 2 at each section.

Spherical $Cu_2O$, namely an assembly particle, is formed as follows through the above Steps 1 and 2.

In the copper(II) precursor solution, the copper carboxyl compound expressed by the following chemical figure 1, or the carboxyl group-containing compound expressed by the following chemical figure 2 and the copper salt, forms copper ion and $R_1—COO^-$ ion. Due to the addition of a weak reducing agent, the copper ion is reduced at a predetermined speed and grown as $Cu_2O$ fine particle, and the $R_1—COO^-$ ion forms coordinate covalent bond on the surface of the formed $Cu_2O$ fine particle. At this time, $COO^-$ is positioned o the surface of the $Cu_2O$ fine particle, and the hydrophobic portion $R_1$ is coordinated out of the fine particle. Accordingly, an outer portion of the $Cu_2O$ fine particle exhibits hydrophobic property, and such $Cu_2O$ fine particles are assembled with each other under the hydrophilic environment, thereby forming spherical $Cu_2O$ assembly particles.

That is to say, the spherical $Cu_2O$ assembly particles are formed by assembling $Cu_2O$ fine particles, which are formed by copper ions in a copper(II) precursor solution at a suitable speed using a weak reducing agent with a predetermined standard reduction potential, by $R_1—COO^-$ ions.

Differently from the above, in case $Cu_2O$ precursor is reduced using a hydrazine-based reducing agent that is a strong reducing agent, as disclosed in Korean Laid-open Patent Publication No. 10-2005-84099, $Cu_2O$ particles are formed with a large size due to the rapid reducing reaction, so there are obtained simple $Cu_2O$ particles, not assembly particles, since $Cu_2O$ particles precipitate before assembling, and the obtained $Cu_2O$ particles have irregular shapes and sizes.

In addition, even in the case that copper sulfate is reduced using a weak reducing agent to make $Cu_2O$ particles, as disclosed in Japanese Laid-open Patent Publication No. 2006-96655, simple $Cu_2O$ particles are obtained since there is no $R_1$—$COO^-$ ion that allows assembling of the formed $Cu_2O$ fine particles.

In the Step 2, the copper(II) precursor and the weak reducing agent in the solution are preferably in the range from 1 mM to 500 mM, respectively.

After that, the spherical $Cu_2O$ assembly particles obtained in the Step 2 are reduced into copper particles using a reducing agent (Step 3).

That is to say, the spherical $Cu_2O$ assembly particles are put into the solvent of the Step 1 and then a reducing agent is added thereto to progress the reducing reaction.

The reducing agent may use any material capable of reducing the $Cu_2O$ assembly particles into copper particles. For example, NaBH4, hydrazine, ascorbic acid, glucose, and ethylene glycol can be used in single or in mixture.

Meanwhile, in order to improve size uniformity of the $Cu_2O$ assembly particles formed in the Step 2 or in order to assist reduction of the $Cu_2O$ assembly particles to copper particles in the Step 3, a surfactant may be further added during the Step 1 or 3. The size of assembly particles may be controlled depending on the kind and dosage of the surfactant, and the added surfactant is present in a state of being formed on the surfaces of the $Cu_2O$ assembly particles.

The surfactant is an amphipathic material having both a hydrophile group and a hydrophobic group in one molecule, and it may adopt a common surfactant used in preparation of $Cu_2O$ particles. For example, the surfactant may be a single molecule surfactant having at least one functional group selected from the group consisting of —OH, —COOH, —SH and —NH, or a polymer surfactant such as polyacrylamide, polyvinylpyrrolidone, and polyvinylalcohol, and they may be used in single or in mixture. In particular, in case the surfactant is polyacrylamide, the shapes and sizes of obtained $Cu_2O$ assembly particles become more uniform, so it is possible to obtain spherical $Cu_2O$ assembly particles whose standard deviation on the diameter is 0 to 20%. The surfactant preferably has a concentration of 10 mM to 1 M.

The Steps 2 and 3 can be executed under mild reaction conditions of 5 to 40° C., and they can be completed within a relatively short time at a normal pressure or in the air.

If the Step 3 is completed, copper particles are separated from the solution by means of a centrifugal separator or the like, thereby obtain a copper particle composition (Step 4).

MODE FOR INVENTION

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

Preparation of $Cu_2O$ Assembly Particles

Preparation Example 1

50 mg of $(CH_3COO)_2Cu.H_2$ and 200 mg of polyacrylamide were dissolved in 4.5 ml of distilled water to prepare a first solution, and 22 mg of ascorbic acid was dissolved in 0.5 ml of distilled water to prepare a second solution. At room temperature and normal pressure and in the air, two solutions were mixed and left fixed for 10 minutes. Subsequently, the mixed solutions were centrifugally separated for 3 minutes at 2000 rpm, and then a supernatant in an upper layer was wasted and the remaining sediment was dispersed again in 20 ml of water. After that, the centrifugal separation was conducted once more to obtain $Cu_2O$ particles.

Figure 3:
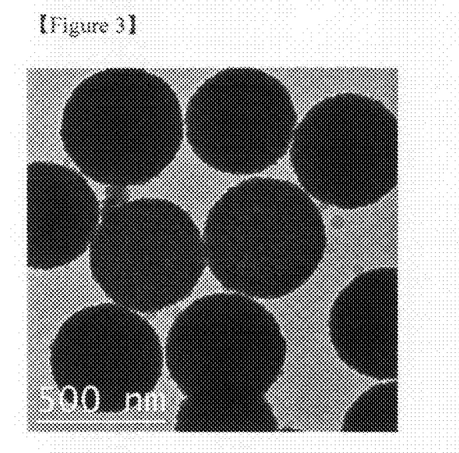
FIG. 3 is a TEM photograph showing the $Cu_2O$ particle prepared according to the preparation example 1.
Figure 5:
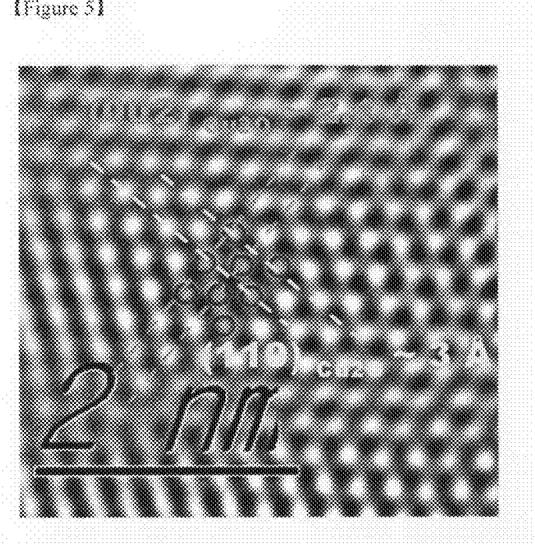
FIG. 5 is a structure analysis photograph of the $Cu_2O$ particle prepared according to the preparation example 1, using HRTEM.
Figure 6:
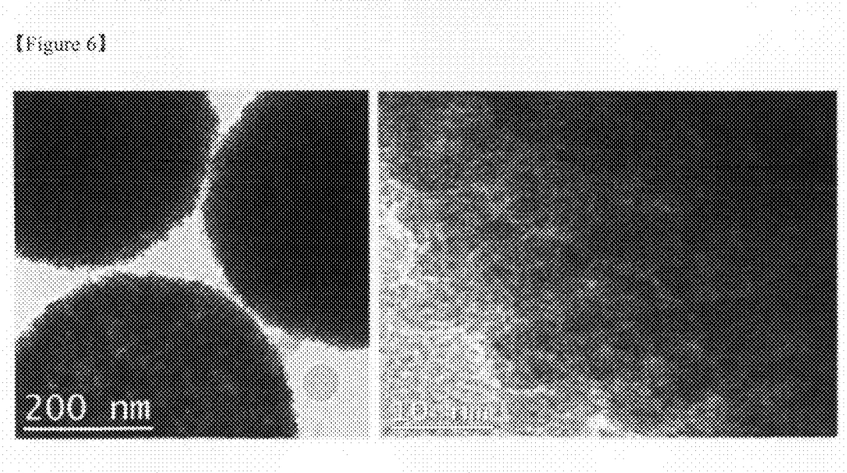
FIG. 6 is a TEM photograph showing a tail portion of the $Cu_2O$ particle prepared according to the preparation example 1.
Figure 7:
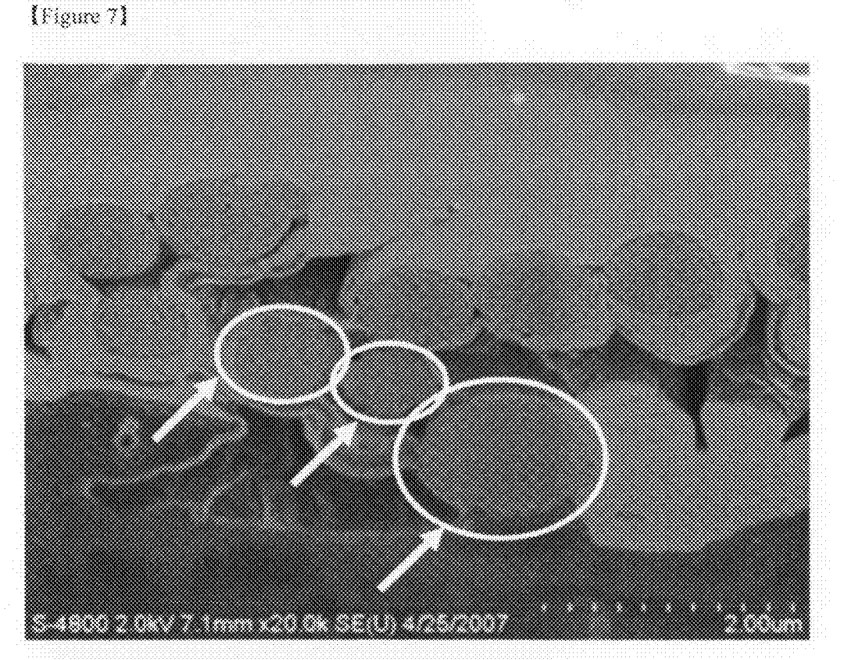
FIG. 7 is a SEM photograph showing a section of the $Cu_2O$ particle prepared according to the preparation example 1, which is cut by FIB.

The $Cu_2O$ particles are shown in the figures: namely a SEM photograph (see FIG. 2), a TEM photograph (see FIG. 3), an XRD analysis graph (see FIG. 4), a structure analysis photograph of $Cu_2O$ particles using HRTEM (see FIG. 5), a TEM photograph of a tail portion of $Cu_2O$ particles (see FIG. 6), and a SEM photograph of a section of $Cu_2O$ particles cut by FIB (see FIG. 7).

Figure 4:
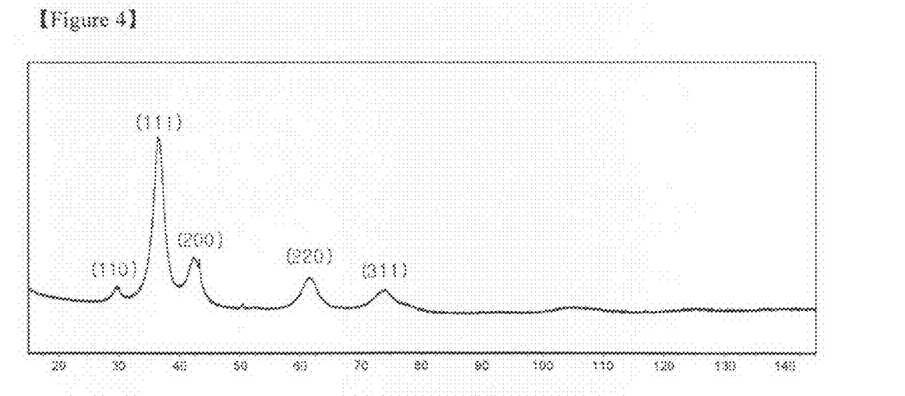
FIG. 4 is a XRD analysis graph of the $Cu_2O$ particle prepared according to the preparation example 1.

According to the Scherrer equation for the XRD pattern of FIG. 4, a crystal size was 4.4 nm, which is identical to a particle size of ~5 nm identified by TEM of FIG. 6.

The size of the formed assembly particles was measured for 200 or more particles using a graphic software (MAC-View) based on the SEM image (FIG. 2), and the obtained statistical distribution was calculated such that an average size is 504.7 nm and a standard deviation is 91.8 (18%).

Preparation Example 2

Figure 8:
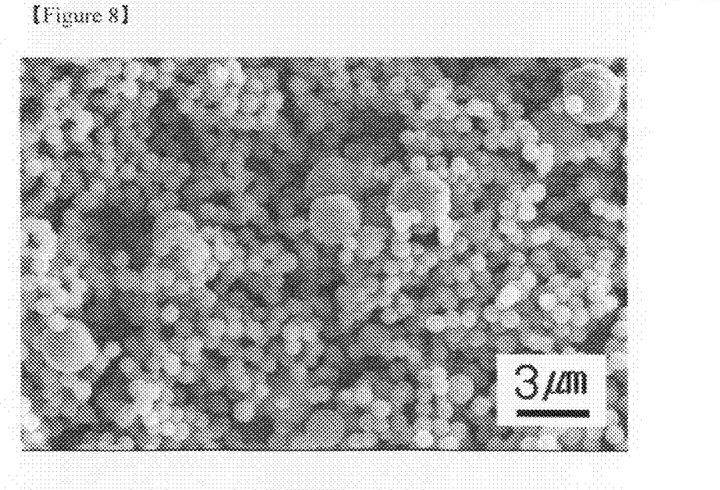
FIG. 8 is a SEM photograph showing a $Cu_2O$ particle prepared according to a second preparation example 2.

$Cu_2O$ particles were prepared in the same way as the preparation example 1, except that polyacrylamide was not added. Seeing the SEM photograph of FIG. 8, there are found several assembly particles with great size, but there were mostly found spherical $Cu_2O$ assembly particles with relatively uniform size. An average size was calculated as 777.2 nm, and a standard deviation was calculated as 300.6 (39%).

Control Group $Cu_2O$ particles were prepared as follows in the same way as the embodiment 1 of Korean Laid-open Patent Publication No. 10-2005-84099.

70 ml of distilled water was added to 8 g of acetic anhydride copper. While being stirred at 25° C., 2.6 ml of hydrazine hydrate was added thereto and reacted such that hydrazine and acetic acid has a mole ratio of 1:2, thereby making $Cu_2O$ particle sediment.

Figure 9:
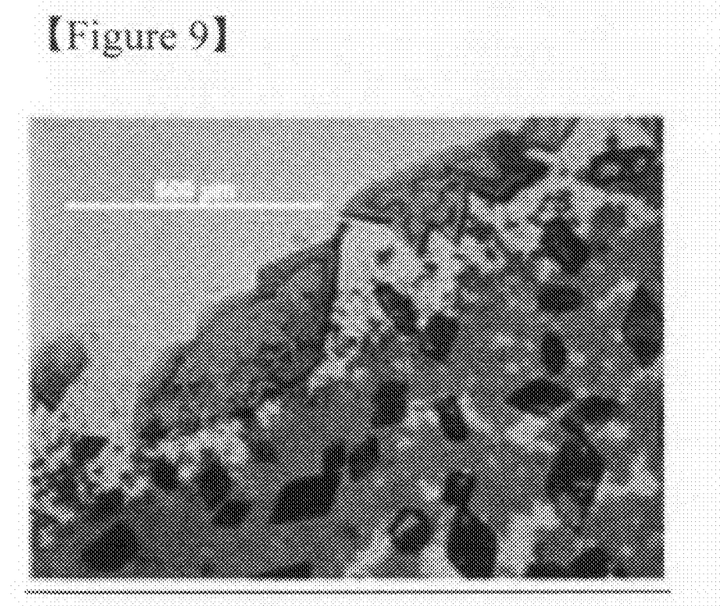
FIG. 9 is an optical microscope photograph showing sediments prepared according to a control group.
Figure 10:
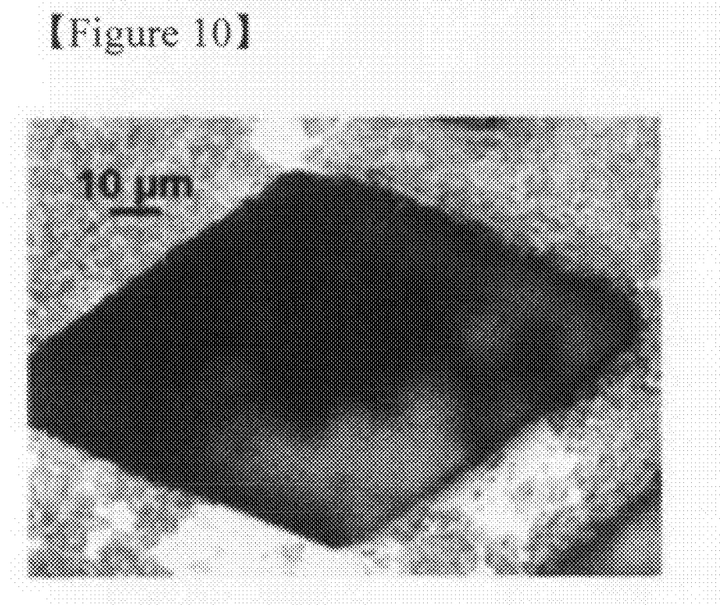
FIG. 10 is an optical microscope photograph showing a part of sediments prepared according to the control group.

The obtained $Cu_2O$ particle sediment was observed using an optical microscope, and there were found mixtures of irregular shapes and sizes (see FIGS. 9 and 10).

Preparation of Copper Particle Composition

Example 30 mg of $Cu_2O$ assembly particles obtained in the preparation example 1 and 75 mg of polyacrylamide were put into 4.5 ml of water to prepare a first solution, and 30 mg of ascorbic acid was dissolved in 0.5 ml of distilled water to prepare a second solution. At room temperature and normal pressure and in the air, two solutions were mixed and left fixed for 2 hours. Subsequently, the mixed solutions were centrifugally separated for 3 minutes at 2000 rpm, and then a supernatant in an upper layer was wasted and the remaining sediment was dispersed again in 20 ml of water. After that, the centrifugal separation was conducted once more to obtain Cu particles.

Figure 11:
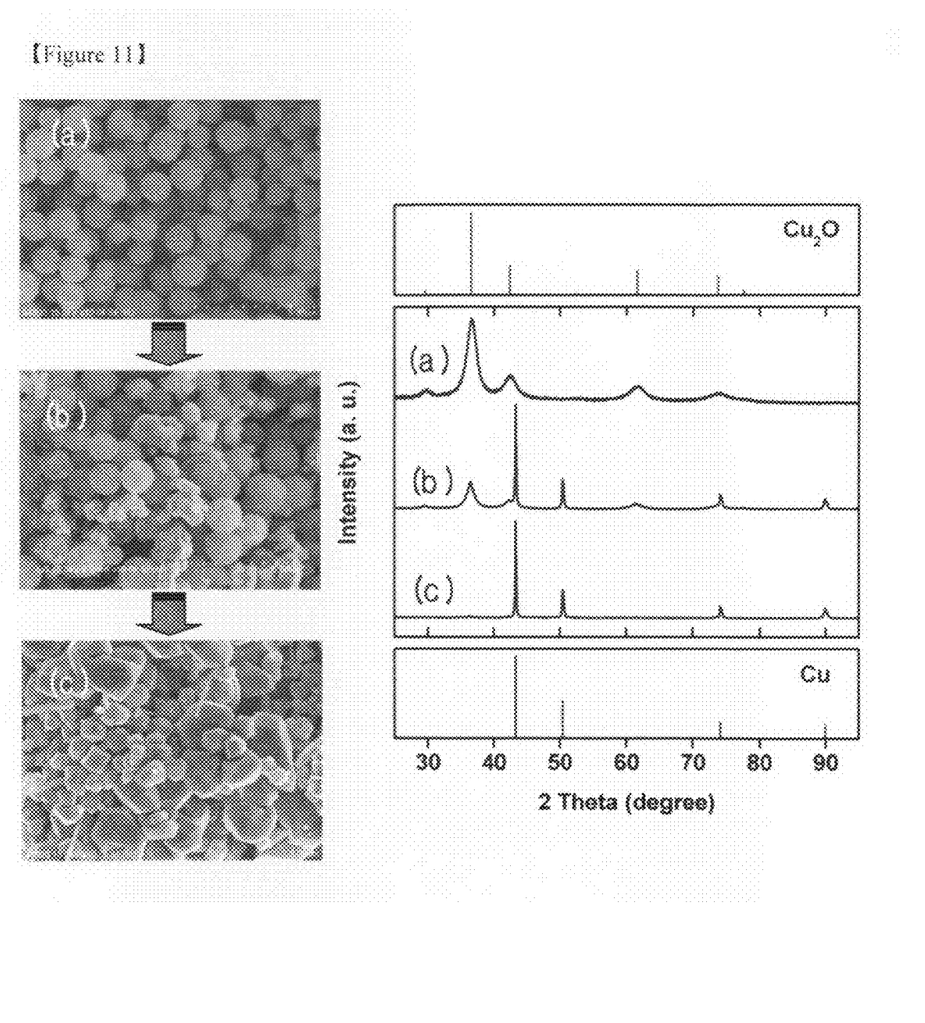
FIG. 11 is a SEM photograph and a XRD pattern, obtained by photographing changing procedures from the $Cu_2O$ assembly particles obtained in the preparation example 1 to copper particles of the example.
Figure 12:
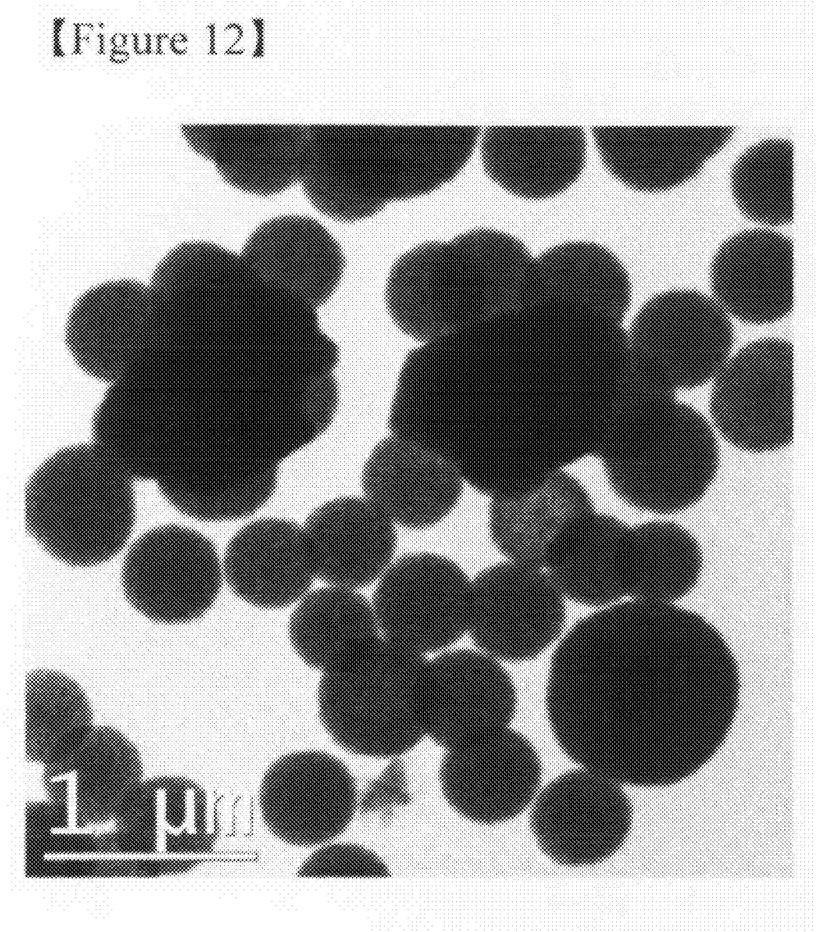
FIG. 12 is a TEM photograph showing a state that $Cu_2O$ assembly particles and copper particles are present together during a reduction process of the example.

FIG. 11 is a SEM photograph and a XRD pattern, obtained by photographing changing procedures from the $Cu_2O$ assembly particles obtained in the preparation example 1 to copper particles of the example, and FIG. 12 is a TEM photograph showing a state that $Cu_2O$ assembly particles and copper particles are present together during a reduction process of the example (the state of FIG. 11 (b)). Seeing FIG. 11, it would be understood that, as Cu$_2$O assembly particles (a) are reduced according to the preparation method of the present invention, copper particles (b) are gradually formed from the Cu$_2$O assembly particles, and a composition (c) composed of only copper particles are prepared if the reduction reaction is completed. Seeing the X-ray diffraction pattern of the formed copper particle composition, it would be found that there is a sharp peak, so it would be understood that the formed copper particles have excellent crystallinity.

Meanwhile, after conducting X-ray diffraction analysis to the copper particle composition according to the example, which was left alone in the air for 25 days at a normal temperature, it was found that the diffraction peak of copper was not changed. Therefore, it would be understood that the copper particles formed according to the preparation method of the present invention have a good resistance against oxidation.

INDUSTRIAL APPLICABILITY

According to the preparation method of the present invention, spherical Cu$_2$O assembly particles with excellent uniformity allow fast production of copper particles so economically, and this preparation process can be executed even in the atmospheric circumstance and at a normal temperature.

In addition, the prepared copper particles have good crystallinity and good resistance against oxidation, so they will be very useful as electronic material.

The invention claimed is:
1. A preparation method of a copper particle composition, comprising:
   [Step 1] dissolving a copper carboxyl compound expressed by the following chemical figure 1, or a carboxyl group-containing compound expressed by the following chemical figure 2 and a copper salt, in a solvent to prepare a copper(II) precursor solution;

(R$_1$—COO)$_2$Cu            Chemical Figure 1 where R$_1$ is an alkyl group of C$_1$ to C$_{18}$,

R$_1$—COOH            Chemical Figure 2 where R$_1$ is an alkyl group of C$_1$ to C$_{18}$,
   [Step 2] putting a weak reducing agent with a standard reduction potential of −0.2 to −0.05V to the prepared copper(II) precursor solution to assemble a plurality of Cu$_2$O fine particles having an average diameter of 1 to 100 nm with a standard deviation of 0 to 10%, thereby forming spherical Cu$_2$O assembly particles having an average diameter of 0.1 to 10 μm with a standard deviation of 0 to 40%;
   [Step 3] reducing the spherical Cu$_2$O assembly particles into copper particles by using a reducing agent; and
   [Step 4] separating the copper particles from the result product.

2. The preparation method of a copper particle composition according to claim 1,
   wherein the copper carboxyl compound is (CH$_3$COO)$_2$Cu.
3. The preparation method of a copper particle composition according to claim 1,
   wherein the copper salt is selected from the group consisting of copper nitrate, copper halide, copper hydroxide, copper sulfate, and their mixtures.
4. The preparation method of a copper particle composition according to claim 1, wherein the solvent is selected from the group consisting of water, C$_1$-C$_6$ low alcohol, dimethyl formamide, dimethyl sulfoxide, tetrahydrofuran, acetonitrile, and their mixtures.
5. The preparation method of a copper particle composition according to claim 4,
   wherein the solvent includes water.
6. The preparation method of a copper particle composition according to claim 1,
   wherein the weak reducing agent is selected from the group consisting of ascorbic acid, diol compound, citric acid, fructose, amine compound, α-hydroxy ketone compound, succinic acid, maltose, and their mixtures.
7. The preparation method of a copper particle composition according to claim 6, wherein the weak reducing agent is ascorbic acid.
8. The preparation method of a copper particle composition according to claim 1,
   wherein a surfactant is added in any or both of Step 1 and Step 2.
9. The preparation method of a copper particle composition according to claim 8,
   wherein the surfactant is a small molecule surfactant having at least one functional group selected from the group consisting of —OH, —COOH, —SH and —NH, or is a polymer surfactant selected from the group consisting of polyacrylamide, polyvinylpyrrolidone, and polyvinylalcohol, and their mixtures.
10. The preparation method of a copper particle composition according to claim 9,
   wherein the surfactant is polyacrylamide, a standard deviation for diameters of the spherical Cu$_2$O assembly particles is 0 to 20%.
11. The preparation method of a copper particle composition according to claim 1, wherein the reducing agent of Step 3 is selected from the group consisting of NaBH$_4$, hydrazine, ascorbic acid, glucose, ethylene glycol, and their mixtures.
12. The preparation method of a copper particle composition according to claim 1, wherein Step 2 and Step 3 are executed at 5 to 40° C.
13. The preparation method of a copper particle composition according to claim 1,
   wherein the carboxyl group-containing compound is CH$_3$COOH.

* * * * *